(12) United States Patent
Murari et al.

(10) Patent No.: US 9,332,499 B2
(45) Date of Patent: May 3, 2016

(54) APPARATUS AND METHODS FOR ENHANCED USER EQUIPMENT POWER MANAGEMENT VIA CONTROLLED CELL CHANGE NOTIFICATIONS

(71) Applicant: QUALCOMM Incorporated, San Diego, CA (US)

(72) Inventors: Harsh Murari, Broomfield, CO (US); Thomas M. Rebman, Boulder, CO (US); Vamsi K. Dokku, San Diego, CA (US); Shrawan Krishna Khatri, San Diego, CA (US); Jimi Atul Shah, Boulder, CO (US); Nirupama Locanindi, San Diego, CA (US); Vinay Paradkar, Broomfield, CO (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 14/040,113

(22) Filed: Sep. 27, 2013

(65) Prior Publication Data

US 2014/0171087 A1 Jun. 19, 2014

Related U.S. Application Data

(60) Provisional application No. 61/737,578, filed on Dec. 14, 2012.

(51) Int. Cl.
*H04W 36/00* (2009.01)
*H04W 52/02* (2009.01)
*H04W 88/06* (2009.01)

(52) U.S. Cl.
CPC ...... *H04W 52/0254* (2013.01); *H04W 52/0225* (2013.01); *H04W 88/06* (2013.01)

(58) Field of Classification Search
CPC ............ H04W 36/00; H04W 36/0066; H04W 52/0225
USPC .......................................................... 455/437
See application file for complete search history.

(56) References Cited

U.S. PATENT DOCUMENTS

| 6,101,388 | A | 8/2000 | Keshavachar |
| 2007/0263574 | A1* | 11/2007 | Lu et al. .......................... 370/338 |
| 2008/0014941 | A1* | 1/2008 | Catovic et al. ................. 455/436 |
| 2009/0068969 | A1 | 3/2009 | Lindoff et al. |
| 2009/0239574 | A1* | 9/2009 | Hussain ..................... 455/552.1 |

(Continued)

FOREIGN PATENT DOCUMENTS

JP 2012/109640 A 6/2012

OTHER PUBLICATIONS

International Search Report and Written Opinion—PCT/US2013/070621—ISA/EPO—Feb. 21, 2014, 12 pages total.

*Primary Examiner* — Qun Shen
(74) *Attorney, Agent, or Firm* — Arent Fox LLP

(57) ABSTRACT

Apparatus and methods for power management in a wireless communication device include detecting a change in a serving cell for data communication from a first cell to a second cell; determining whether a terminal equipment (TE) is in a low power state; detecting a first technology type of the first cell and a second technology type of the second cell; determining whether the second technology type is a different technology mode than the first technology type; sending a cell change notification to a data processor associated with the TE when the second technology type is in the different technology mode than the first technology type and the TE is not in a low power state; and suppressing the sending of the cell change notification when the second technology type is not in the different technology mode and the TE is in the low power state.

22 Claims, 9 Drawing Sheets

(56) References Cited

U.S. PATENT DOCUMENTS

| | | | |
|---|---|---|---|
| 2009/0257417 A1* | 10/2009 | Allen | H04W 76/041 370/338 |
| 2010/0113019 A1* | 5/2010 | Jeong et al. | 455/435.2 |
| 2011/0105153 A1* | 5/2011 | Miklos et al. | 455/456.5 |
| 2011/0194530 A1* | 8/2011 | Tinnakornsrisuphap | H04W 36/04 370/331 |
| 2012/0122391 A1 | 5/2012 | Yokoyama | |
| 2012/0196604 A1 | 8/2012 | Ohmoto | |
| 2012/0202557 A1* | 8/2012 | Olofsson et al. | 455/525 |
| 2012/0287831 A1 | 11/2012 | Cheng et al. | |
| 2013/0267234 A1* | 10/2013 | Choi | H04W 36/0005 455/437 |
| 2014/0342740 A1* | 11/2014 | Kim | H04W 36/14 455/437 |

* cited by examiner

APPARATUS AND METHODS FOR ENHANCED USER EQUIPMENT POWER MANAGEMENT VIA CONTROLLED CELL CHANGE NOTIFICATIONS

CLAIM OF PRIORITY UNDER 35 U.S.C. §119

The present Application for Patent claims priority to Provisional Application No. 61/737,578 entitled "APPARATUS AND METHOD FOR ENHANCED USER EQUIPMENT POWER MANAGEMENT VIA CONTROLLED CELL CHANGE NOTIFICATIONS" filed Dec. 14, 2012, and assigned to the assignee hereof and hereby expressly incorporated by reference herein.

BACKGROUND

1. Field

Aspects of the present disclosure relate generally to wireless communication systems, and more particularly, to enhanced user equipment power management.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

In some wireless communication network, it is noted that one problem with current implementations relates to the high power consumption caused by receiving frequent cell change indications during operation at or near cell edge coverage areas. The foregoing limitations of the current implementations inhibit user equipments and/or wireless devices from achieving higher wireless communication quality. Thus, enhancements in wireless communication device power management are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method of power management in a wireless communication device comprises detecting a change in a serving cell for data communication from a first cell to a second cell and determining whether a terminal equipment (TE) is in a low power state. The method further comprises detecting a first technology type of the first cell and a second technology type of the second cell and determining whether the second technology type is a different technology mode than the first technology type. Additionally, the method comprises sending a cell change notification to a data processor associated with the TE when the second technology type is in the different technology mode than the first technology type and the TE is not in a low power state. Moreover, the method comprises suppressing the sending of the cell change notification when the second technology type is not in the different technology mode and the TE is in the low power state.

Further aspects provide a computer program product comprising a computer-readable medium including at least one instruction executable to cause the computer to detect a change in a serving cell for data communication from a first cell to a second cell. The computer program product further comprises at least one instruction executable to cause the computer to determine whether a terminal equipment (TE) is in a low power state and at least one instruction executable to cause the computer to detect a first technology type of the first cell and a second technology type of the second cell. Additionally, the computer program product comprises at least one instruction executable to cause the computer to determine whether the second technology type is a different technology mode than the first technology type and at least one instruction executable to cause the computer to send a cell change notification to a data processor associated with the TE when the second technology type is in the different technology mode than the first technology type and the TE is not in a low power state. Moreover, the computer program product comprises at least one instruction executable to cause the computer to suppress the sending of the cell change notification when the second technology type is not in the different technology mode and the TE is in the low power state.

In an additional aspect, an apparatus for power management comprises means for detecting a change in a serving cell for data communication from a first cell to a second cell. The apparatus further comprises means for determining whether a terminal equipment (TE) is in a low power state and means for detecting a first technology type of the first cell and a second technology type of the second cell. Additionally, the apparatus comprises means for determining whether the second technology type is a different technology mode than the first technology type and means for sending a cell change notification to a data processor associated with the TE when the second technology type is in the different technology mode than the first technology type and the TE is not in a low power state. Moreover, the apparatus comprises means for suppressing the sending of the cell change notification when the second technology type is not in the different technology mode and the TE is in the low power state.

Additional aspects provide a user equipment apparatus comprising a memory storing executable instructions and a processor in communication with the memory, wherein the processor is configured to execute the instructions to detect a change in a serving cell for data communication from a first cell to a second cell. The processor is further configured to determine whether a terminal equipment (TE) is in a low power state and detect a first technology type of the first cell and a second technology type of the second cell. Additionally, the processor is configured to determine whether the second technology type is a different technology mode than the first technology type and send a cell change notification to a data processor associated with the TE when the second technology type is in the different technology mode than the first technology type and the TE is not in a low power state. Moreover, the processor is configured to suppress the sending of the cell change notification when the second technology type is not in the different technology mode and the TE is in the low power state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to enhancing power management and consumption in a user equipment (UE) to provide greater power supply duration. Various aspects of the disclosure address issues relating to the frequent transitions to an active state from a low power state for UE devices when in a cell edge coverage area. The UE, when in a cell edge area including coverage of at least two base stations, may experience frequent cell changes. Each cell change causes the generation of a cell change notification at the UE. In an aspect, the UE must awake from a low power state in order to process each cell change notification. However, ultimately the UE may not require processing of certain ones of the cell change notifications, e.g. when the UE enters the coverage area of a serving cell operating in the same technology mode, and when a user interface of the UE is turned off and/or when a data call is dormant. Thus, frequent UE state changes may needlessly cause the consumption of valuable UE power resources. As such, in some aspects, the present apparatus and method may provide an efficient solution, as compared to current solutions, to suppress the cell change notifications under certain conditions to improve power supply duration.

Figure 1:
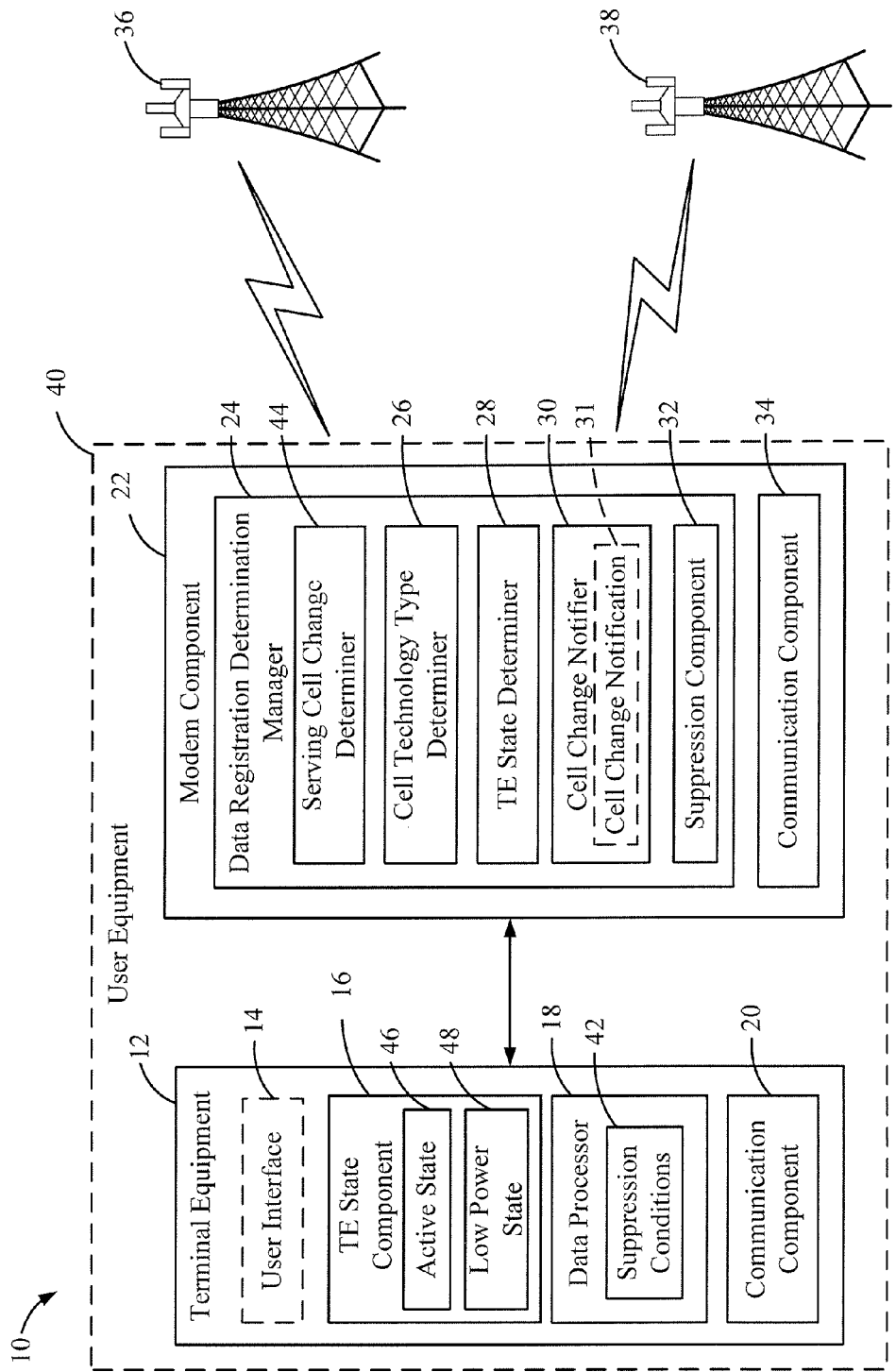
FIG. 1 is a schematic diagram of a user equipment device including a user equipment, which may be implemented in a terminal equipment and modem component, for performing a power management procedure in a network as described herein.

Referring to FIG. 1, in an aspect, a wireless communication system 10 includes a UE 40 in communication coverage of at least two base stations 36 and 38. In some examples, wireless communication between the UE 40 and the base stations 36 and 38 may occur on one or more wireless link(s). In an aspect, but not limited hereto, the UE 40 may include a terminal equipment (TE) 12 in communication with a modem component 22. The modem component 22 may be a separate device from the TE 12, e.g., removably connectable to the TE 12, or modem component 22 can be integrated with or otherwise fixedly connected with the TE 12. Also, for example, the TE 12 and the modem component 22 may communicate either through a wired connection or wirelessly. The modem component 22 may provide communication and processing capabilities for the UE 40.

In one aspect, TE 12 may include a user interface 14 configured to provide perceptible data to the user. In further aspects, the user interface 14 may be configured to receive user inputs. In some examples, the user interface 14 may be one of a touch screen display and/or a keyboard with a screen. Moreover, the user interface 14 may be configured to turn off when in a low power state 48. For example, the touch screen display may turn off when in the low power state 48 indicating non-usage for a pre-defined duration.

In further aspects, the TE 12 may include a TE state component 16 configured to control the operating state of the TE 12. For example, in an aspect, the TE 12 may transition from an active state 46 to the low power state 48. The low power state 48 may be, for example, an idle mode state in which the UE 40 consumes power at a lower level. The active state 46 may be, for example, the state in which full operating capabilities are provided to the user. Further, for example, the active state 46 may be an operating state that operates at a higher power level than the low power state 48. In further aspects, the active state 46 may be a non-idle state.

In another aspect, the TE 12 may include a data processor 18 configured to process, among other data, the received cell change notifications 31 from the modem component 22. Further, the data processor 18 may, in some aspects, awake, or cause the TE 12 to transition from a low power state 48, e.g., to active state 46 or some other non-low power state, after receiving the cell change notification 31 from the modem component 22. Additionally, the TE 12, through the data processor 18, may notify the modem component 22 of suppression conditions 42. Suppression conditions 42 may include specific scenarios instructing the modem component 22 to suppress or prevent the transmission of the cell change notification 31 to the TE 12. In some aspects, the suppression conditions 42 may be configurable. Suppression conditions 42 may include suppressing cell change notifications 31 when a technology type of one of base stations 36 and 38 is in the same technology mode as the serving cell and the UE 40 is in the low power state 48. In some aspects, indication of the low power state 48 may be provided to the modem component 22 via the data processor 18. Further, the low power state 48 may be identified by the data processor 18 based on whether the user interface comprising a screen is "off" or if no data call is occurring.

Moreover, TE 12 may include a communication component 20, which may be configured to communicate with any one or more of the modem component 22, the base station 36, or the base station 38, via one or more wired or wireless link(s). For example, in an aspect, the communication component 20 may send suppression conditions 42 to the modem component 22 for enhanced power management of the UE 40. Likewise, the communication component 20 may receive cell change notifications 31 from the modem component 22. Also, the communication component 20 may transmit or receive data signals from the plurality of base stations 36 and 38.

The UE 40 may include a modem component 22 configured to provide communication and processing capabilities for the UE 40. The modem component 22 may include a data registration determination manager 24, which may be configured to provide enhanced power management functionalities to the TE 12.

For example, the data registration determination manager 24 may include a serving cell change determiner 44, which may be configured to detect a change in a serving cell for data communication from a first cell (e.g., base station 36) to a second cell (e.g., base station 38). For example, the serving cell change determiner 44 may determine when service to the UE 40 changes from the base station 36 to the base station 38. In the present aspects, cell and base station are used interchangeably to mean a provider of cell service to the UE 40.

In a further aspect, the data registration determination manager 24 may include a cell technology type determiner 26, which may be configured to detect a first technology type of the first cell and a second technology type of the second cell. For example, in an aspect, the cell technology type determiner 26 may detect the technology type of the base stations 36 and 38. The technology type may indicate the particular radio access technology of the serving cell or base station. Further, in some aspects, the cell technology type determiner 26 may then determine whether the second technology type is a different technology mode than the first technology type. Each technology mode identifies one or more technology types or radio access technologies that may be considered to be in the same family. For example, each technology mode may comprise a set of communication parameters each having a mode-specific range. In other words, technology types or radio access technologies that may be considered to be in the same family, and hence within the same technology mode, have relatively similar communication parameters, and thus a major reconfiguration of UE 40 would not be necessitated when moving between cells of a same technology mode. Accordingly, the cell technology type determiner 26 may determine whether two cells are in a same technology mode, e.g. determining whether the second technology type corresponds to the first technology mode and determines whether the first technology type corresponds to the second technology mode.

Table 1 lists example technology types for the 3GPP standard corresponding to technology modes. For example, WCDMA, HSDPA, HSUPA, HSDPA_PLUS and DC_HSDPA_PLUS are technology types of the same technology mode, whereas LTE is a technology type of a different technology mode.

TABLE 1

Example Technology Modes for Technology Types in 3GPP

| Mode 1 | Mode 2 | Mode 3 | Mode 4 |
|---|---|---|---|
| WCDMA | GPRS | LTE | TDSCDMA |
| HSDPA | EDGE | | |
| HSUPA | | | |
| HSDPA_PLUS | | | |
| DC_HSDPA_PLUS | | | |
| 64_QAM | | | |

Table 2 below lists example technology types for the 3GPP2 standard corresponding to technology modes. For example, EVDO_REV0, EVDO_REV_A and EVDO_REVB are technology types of the same technology mode, whereas 1× is a technology type of a different technology mode.

TABLE 2

Example Technology Modes for Technology Types in 3GPP2

| Mode 1 | Mode 2 | Mode 3 |
|---|---|---|
| 1X | EVDO_REV0 | EHRPD |
| | EVDO_REV_A | |
| | EVDO_REVB | |

Further, the data registration determination manager 24 may obtain a plurality of cell technology types each having a corresponding technology mode, which may include at least a first technology mode different from a second technology mode.

In additional aspects, the data registration determination manager 24 may include a TE state determiner 28, which may be configured to determine whether the TE is in the low power state 48. The TE state determiner 28 may, in some aspects, receive an identification of the low power state 48 from the data processor 18 of the TE 12. Further, the TE state determiner 28 may detect the TE 12 state.

In another aspect, the data registration determination manager 24 may include a cell change notifier 30, which may be configured to send a cell change notification 31 to the data processor 18 of the TE 12 when the second technology type is in the different technology mode than the first technology type and the TE 12 is not in the low power state 48. For example, if the TE state determiner 28 detects that the TE 12 is in the low power state 48 and the cell technology type determiner 26 determines that the second technology type is in a different technology mode as the first technology type, then the cell change notifier 30 will send the cell change notification 31 to the data processor 18. In some aspects, the cell change notification 31 may comprise a data system status notification. The notification may be made to the TE 12 via a communication component 34 on the modem component 22.

In a further aspect, the data registration determination manager 24 may include a suppression component 32, which may be configured to suppress the sending of the cell change notification 31 when the second technology type is not in the different technology mode and the TE 12 is in the low power state 48. For example, the suppression component 32 may suppress a cell change notification 31 when the first and second technology types corresponding to the cells or base stations fall within the same technology mode and the TE 12 is in the low power state 48. Suppression of the cell change notification 31 includes, but is not limited to, storing the cell change notification 31 in a buffer of the modem component 22 and/or storing the cell change notification 31 in a buffer of the TE 12.

It should be understood that the term "state," with respect to the various operational modes of the UE 40 mentioned in the foregoing aspects, can be used interchangeably with "mode" and/or "configuration".

Thus, based on the foregoing aspects, the modem component 22 provides enhanced power management capabilities for the UE device 40 when in cell edge coverage by suppressing the sending of the cell change notification 31 when the second technology type is not in the different technology mode and the TE 12 is in the low power state 48.

Figure 2:
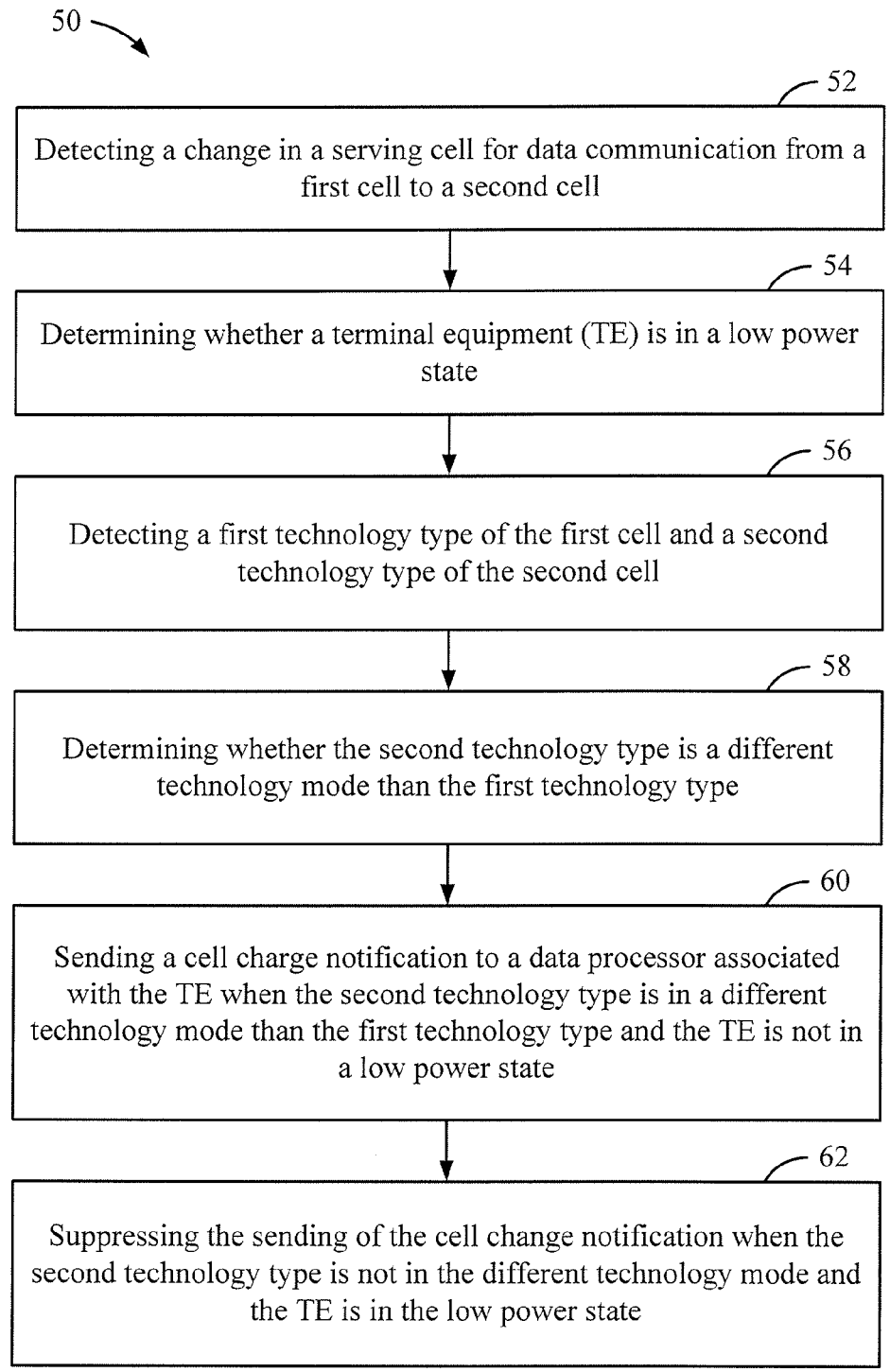
FIG. 2 is a flow chart of an aspect of a method of power management, e.g. according to FIG. 1.

Referring to FIG. 2, in an operational aspect, a UE such as UE 40 (FIG. 1) may perform one aspect of method 50 for power management in a wireless communication network. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

At block 52, a method 50 includes detecting a change in a serving cell for data communication from a first cell (e.g., base station 36) to a second cell (e.g., base station 38). For example, as described herein, data registration determination manager 24 and/or modem component 22 (FIG. 1) may execute serving cell change determiner 44 to actively or passively detect a change in a serving cell.

Method 50 also includes determining whether a TE 12 is in the low power state 48 (Block 54). For example, as described herein, data registration determination manager 24 and/or modem component 22 (FIG. 1) may execute TE state determiner 28 to determine whether the TE 12 is in the low power state 48. The determination may be based on receiving identification of the low power state 48 from the data processor 18 of the TE 12. Further, in some aspects, the identification of the low power state 48 may be based on at least one of screen off (e.g., UI 14 is turned off) or lack of data call.

Also, method 50 includes detecting a first technology type of the first cell (e.g., base station 36) and a second technology type of the second cell (e.g., base station 38) (Block 56). For example, as described herein, data registration determination manager 24 and/or modem component 22 (FIG. 1) may execute cell technology type determiner 26 to detect the first and second technology types.

After detecting the technology types of the first and second cell, method 50, at Block 58, includes determining whether the second technology type is a different technology mode than the first technology type. For example, as described herein, data registration determination manager 24 and/or modem component 22 (FIG. 1) may execute cell technology type determiner 26 to compare the technology modes of the at least two technology types corresponding to the base stations 36 and 38 (e.g., cells). Further, the foregoing determination may include determining whether the second technology type corresponds to the first technology mode and determining whether the first technology type corresponds to the second technology mode.

Further, method 50 includes sending a cell change notification 31 to a data processor 18 associated with the TE 12 when the second technology type is in the different technology mode than the first technology type and the TE 12 is not in a low power state 48 (Block 60). For example, as described herein, data registration determination manager 24 and/or modem component 22 (FIG. 1) may execute cell change notifier 30 to notify the data processor 18 of the TE 12 of the cell change notification 31 only if the TE 12 is in the low power state 48 and the serving cell in the different technology mode. Moreover, each technology mode comprises a set of communication parameters each having a mode-specific range.

Additionally, method 50 includes suppressing the sending of the cell change notification 31 when the second technology type is not in the different technology mode and the TE 12 is in the low power state 48. For example, as described herein, data registration determination manager 24 and/or modem component 22 (FIG. 1) may execute suppression component 32 to inhibit the communication of the cell change notification 31 to the data processor 18 based on the foregoing conditions.

In an aspect, the methodology 50 may be performed by components associated with a UE (e.g., UE 40). Additionally, while the methodology shown and described as a series of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

Thus, the present apparatus and methods include UE 40 state control by utilizing a modem component 22 to manage the transmission of the cell change notification 31 to the data processor 18, thereby preventing the TE 12 from needlessly switching from the low power state 48 to the active state 46 under certain conditions. The foregoing provides improved power management features for UE 40 devices.

Figure 3:
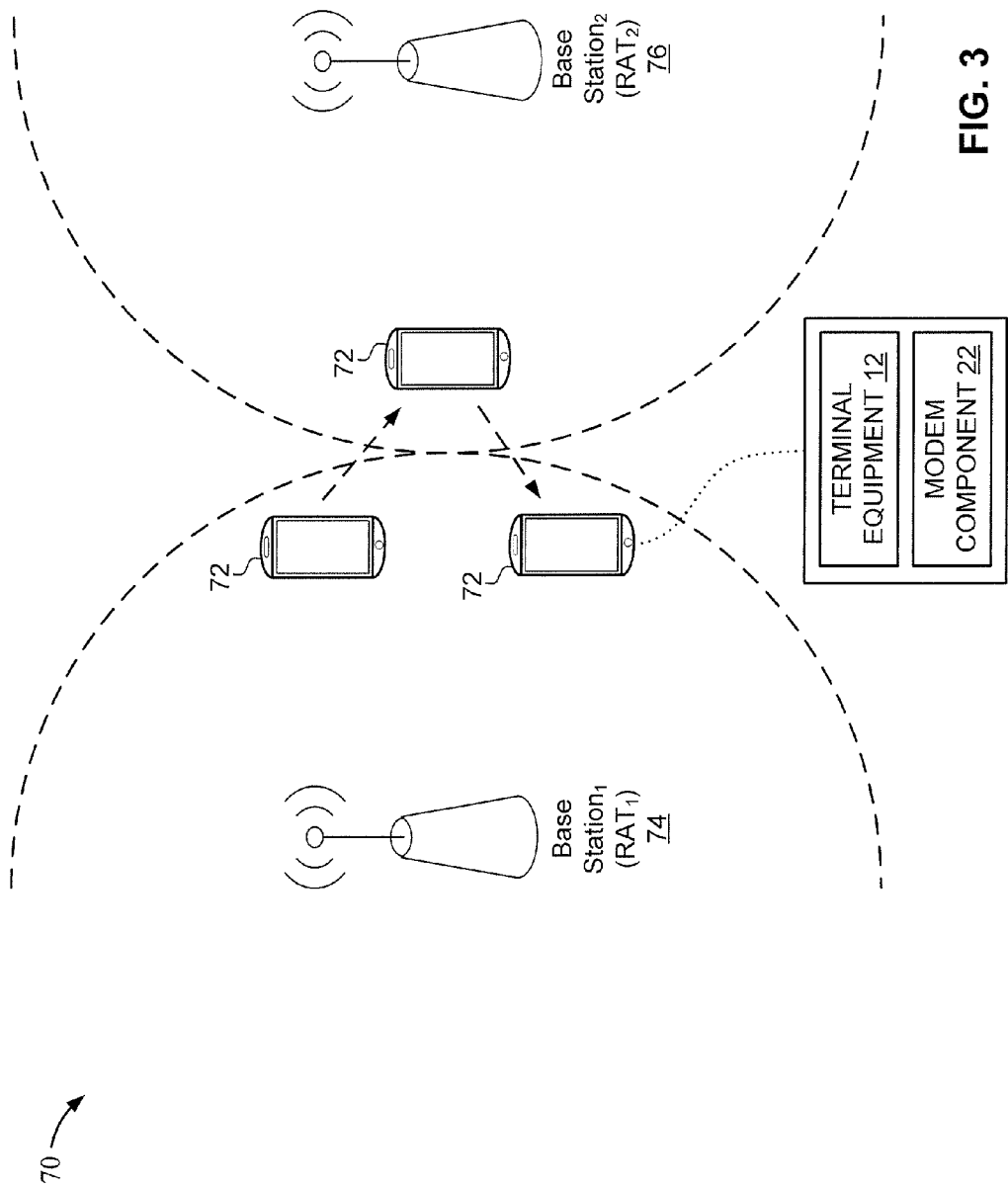
FIG. 3 is a conceptual diagram illustrating an aspect of user equipment movement in a wireless communication network, e.g., according to FIG. 1.

Referring to FIG. 3, in an aspect, wireless communication network 70 includes at least first base station 74, second base station 76 and at least one UE 40 at or near the communication (cell) boundary of the at least first base station 74 and second base station 76. Further, first base station 74 may be of or operating according to a first RAT. Likewise, second base station 76 may be of or operating according to a second RAT. As described herein, based on the RAT type of the first base station 74 and RAT type of the second base station 76, UE 72 may be configured by one or both of terminal equipment 12 and modem component 22 to suppress the sending of a cell change notification when the TE is in the low power state.

For example, according to wireless communication network 70, UE may switch or transition from a wireless coverage area of first base station 74 to a wireless coverage area of second base station 76, or vice versa (e.g., as shown using the dashed arrows). In such a scenario, modem component 22 would be triggered to send a cell change notification to a data processor of terminal equipment 12 every time UE 72 switches or transitions from the wireless coverage area of first base station 74 to the wireless coverage area of second base station 76, or vice versa. As such, during the switching/transitioning scenario, UE 72 would transition from a low power state to an active state, thereby increasing power consumption.

In a non-limiting example, first RAT of first base station 74 may be from or of a different mode (inter-RAT) than second RAT of second base station 76. Accordingly, UE 72 may, via terminal equipment 12 and modem component 22, suppress the sending of the cell change notification when terminal equipment 12 is in a low power state. That is, when UE 72 is switching/transitioning from the wireless coverage area of first base station 74 to the wireless coverage area of second base station 76, or vice versa, UE 72 may not transition from a low power state to an active state when first RAT of first base station 74 is from or of a different mode (inter-RAT) than second RAT of second base station 76 and is in a low power state.

Figure 4:
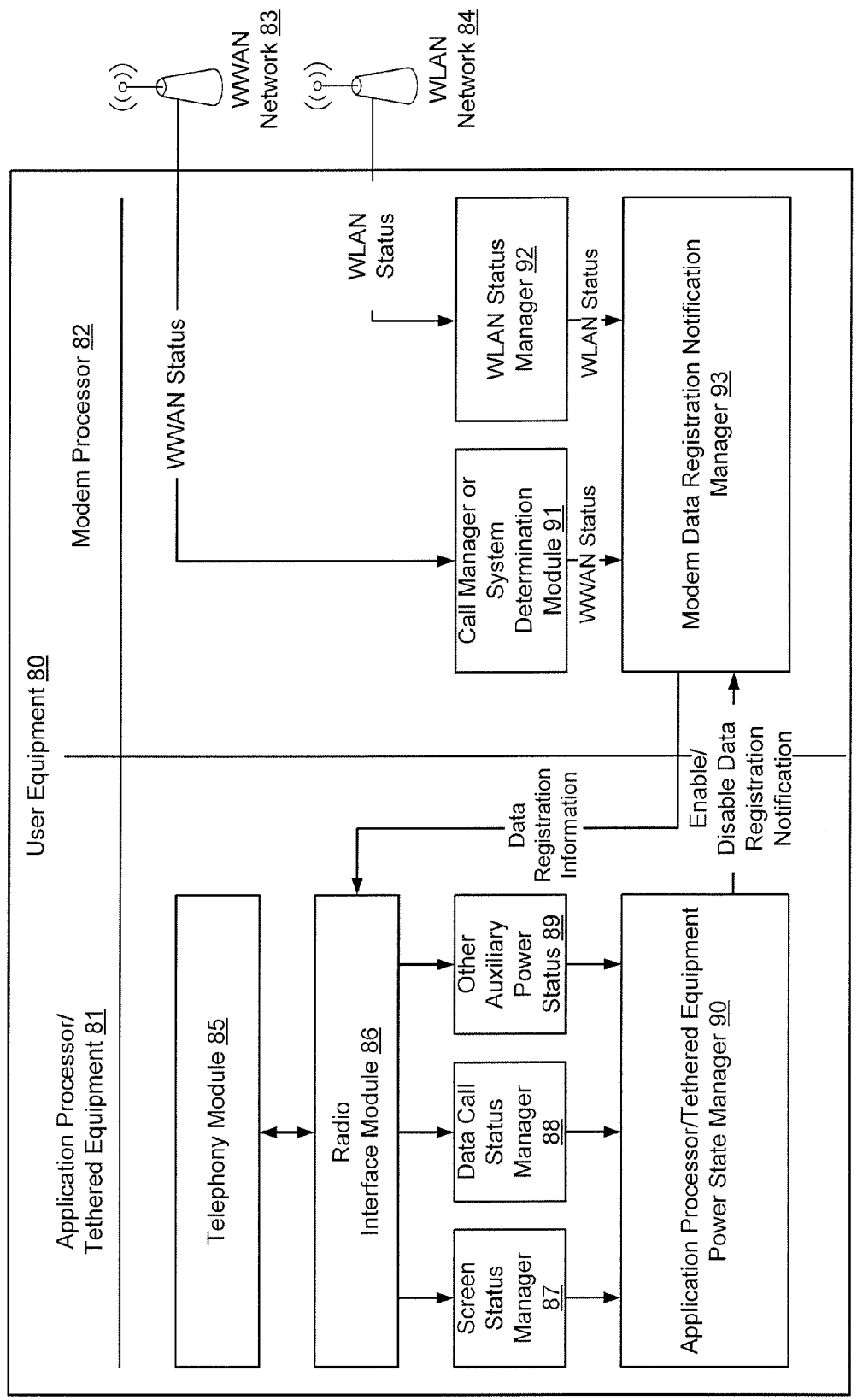
FIG. 4 is block diagram illustrating an example implementation of the terminal equipment and modem component in a user equipment, e.g., according to FIG. 1.

Referring to FIG. 4, in an aspect, an example UE 80 includes an application processor/tethered equipment 81 and modem processor 82, which may be configured to suppress cell change notifications under certain conditions to improve power supply duration, as described herein. It should be noted that, for example, the UE represented in FIG. 4 and the modules and/or components thereof, may correspond directly or indirectly to the UE 40 and UE 40 components thereof of FIG. 1 and described herein. Further, any one or more of the UE components disclosed in FIG. 4 may be implemented as or in any one or more of the components of UE 40 described herein. For example, application processor/tethered equipment 81 may similar to or the same as terminal equipment 12 (FIG. 1). Further, for instance, modem processor 82 may be similar to or the same as modem component 22 (FIG. 1).

Moreover, telephony module 85 of application processor/tethered equipment 81 may correspond, for example, to the communication component 20 (FIG. 1) described herein. Radio interface module 86 may similarly correspond, for example, to communication component 20 (FIG. 1) described herein. Screen status manager 87, data call status manager 88 and other auxiliary power status 89 may, for example, be implemented in any one or more of user interface 14 (FIG. 1), TE state component 16 (FIG. 1), and/or the data processor 18 (FIG. 1) described herein. Moreover, the application processor/tethered equipment power state manager 90 may, for example, correspond to data processor 18 (FIG. 1) described herein.

In a further aspect, modem processor 82 may correspond to, or be implemented as modem component 22 (FIG. 1) described herein. Further, call manager or system determination module 91 and WLAN status manager 92 may correspond to, or be implemented in any one or more of serving cell change determiner 44 (FIG. 1), cell technology type determiner 26 (FIG. 1), and/or communication component 34 (FIG. 1) described herein. Additionally, the modem data registration notification manager 93 (FIG. 1) may correspond to, or be implemented in any one or more of the components of data registration determination manager 24 (FIG. 1) described herein. The communication data including the data registration information and the enable/disable data registration notification disclosed may be implemented as the suppression condition information or cell change notifications described herein. Further, the foregoing communication data may be communicated, for example, between any component of the TE 12 and modem component 22.

Finally, any one of the plurality of base stations 36 and 38 (FIG. 1) described herein may correspond to the WWAN network 83 or WLAN network 84, respectively.

Figure 5:
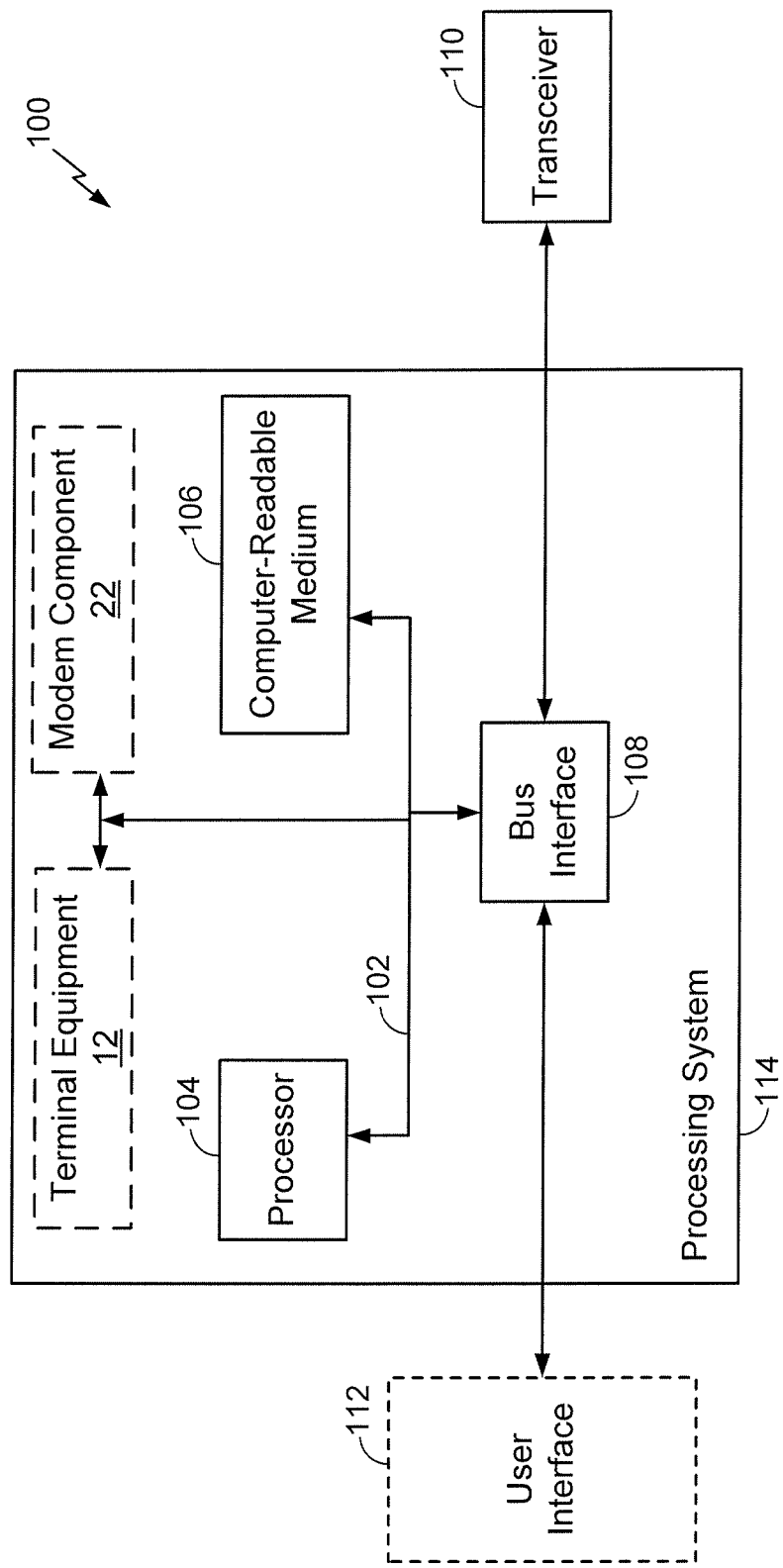
FIG. 5 is a block diagram illustrating an example of a hardware implementation for an apparatus employing a processing system including an aspect of the user equipment and modem components described herein.

FIG. 5 is a block diagram illustrating an example of a hardware implementation for an apparatus 100 employing a processing system 114, wherein apparatus 100 may be the same as or similar to UE 40 including TE 12 and modem component 22 (FIG. 1). In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

In an aspect, the TE 12 and modem component 22 (FIG. 1) may be implemented by any one or any combination of processor 104 and computer-readable medium 106. For example, the processor 104 and/or computer readable medium 106 may be configured, via the modem component 22, to suppress the sending of the cell change notification when the second technology type is not in the different technology mode and the TE is in the low power state.

The various concepts presented throughout this disclosure may be implemented across a broad variety of telecommunication systems, network architectures, and communication standards.

By way of example and without limitation, the aspects of the present disclosure illustrated in FIG. 5 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210 that may be the same as UE 40 (FIG. 1) including the TE 12 and modem component 22. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device.

The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
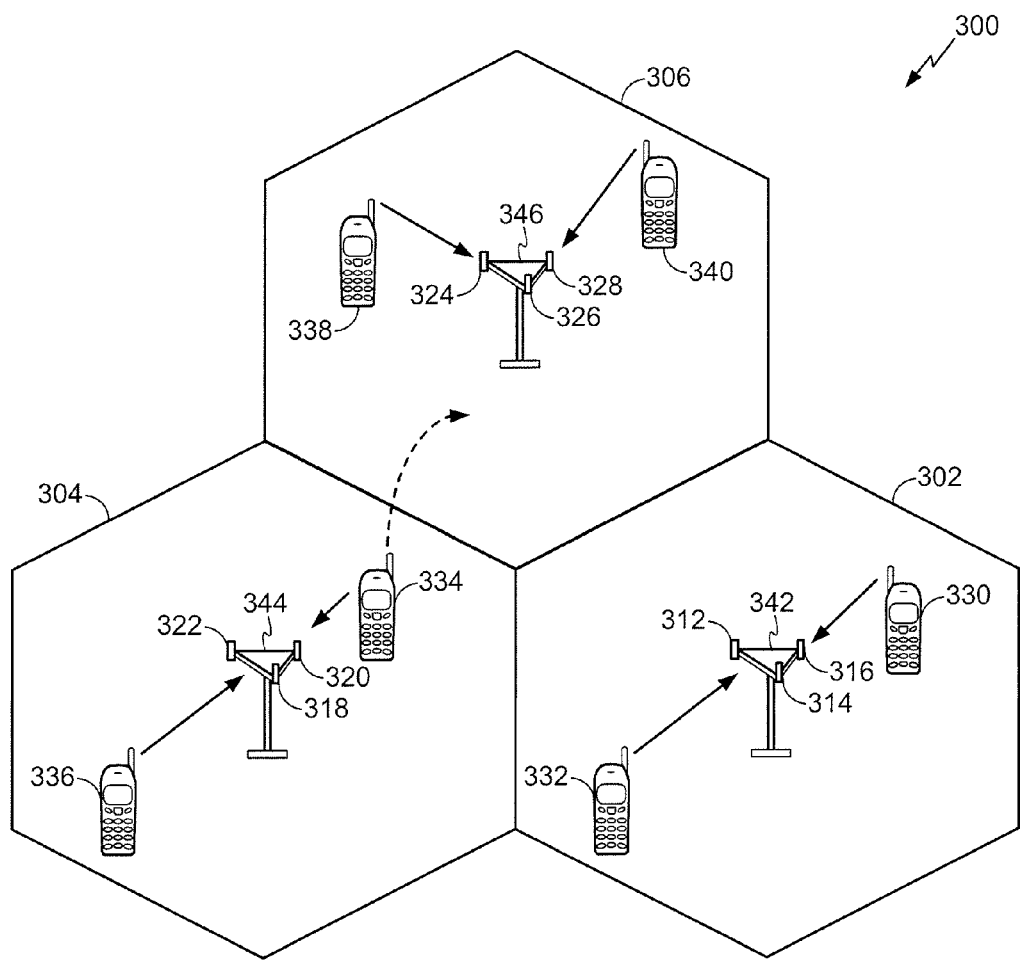
FIG. 7 is a conceptual diagram illustrating an example of an access network including a UE having the user equipment described herein.

Referring to FIG. 7, an access network 300 in a UTRAN architecture is illustrated in which a user equipment, such as a user equipment the same as or similar to UE 40 (FIG. 1) including terminal equipment 12 and modem component 22 may operate. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 4) for all the UEs 330, 332, 334, 336, 338, 340 in the respective cells 302, 304, and 306. In an aspect, UEs 330, 332, 334, 336, 338 and 340 may include the TE 12 and modem component 22 (FIG. 1).

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 2), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 8.

Figure 8:
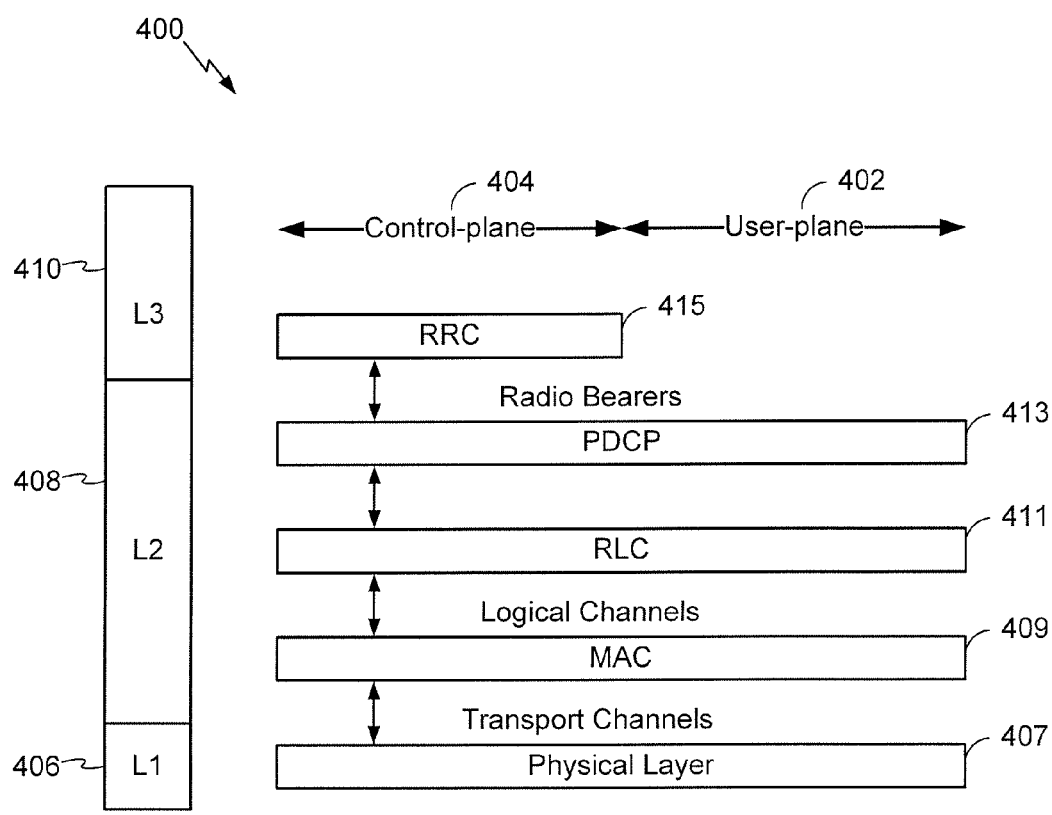
FIG. 8 is a conceptual diagram illustrating an example of a radio protocol architecture for the user and control plane that may be utilized by the UE of FIG. 1.

Referring to FIG. 8, an example radio protocol architecture 400 relates to the user plane 402 and the control plane 404 of a user equipment (UE) or node B/base station. For example, architecture 400 may be included in a UE 40 (FIG. 1) including TE 12 and modem component 22. The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 6:
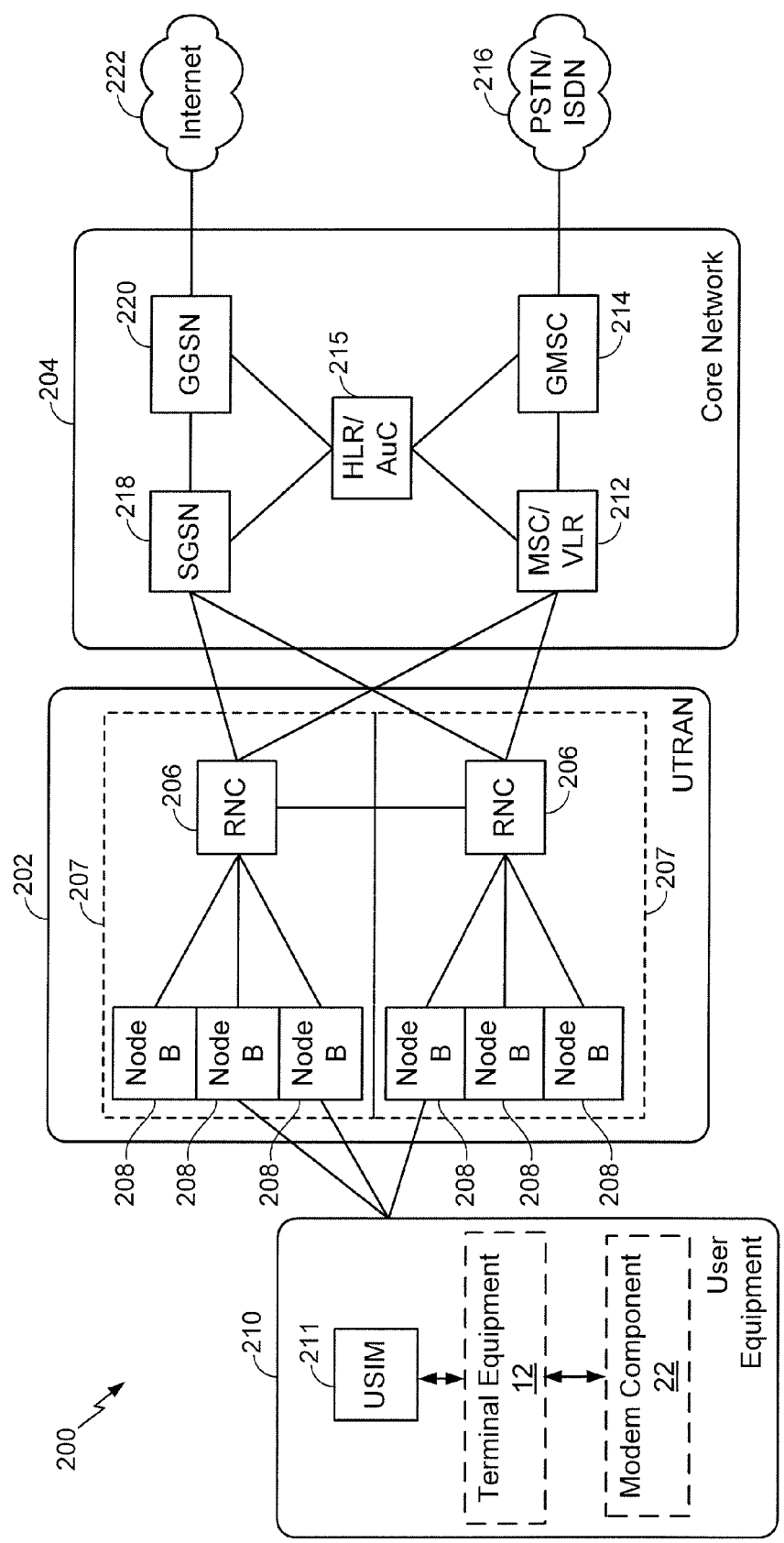
FIG. 6 is a block diagram conceptually illustrating an example of a telecommunications system including an aspect of a user equipment (UE) described herein.
Figure 9:
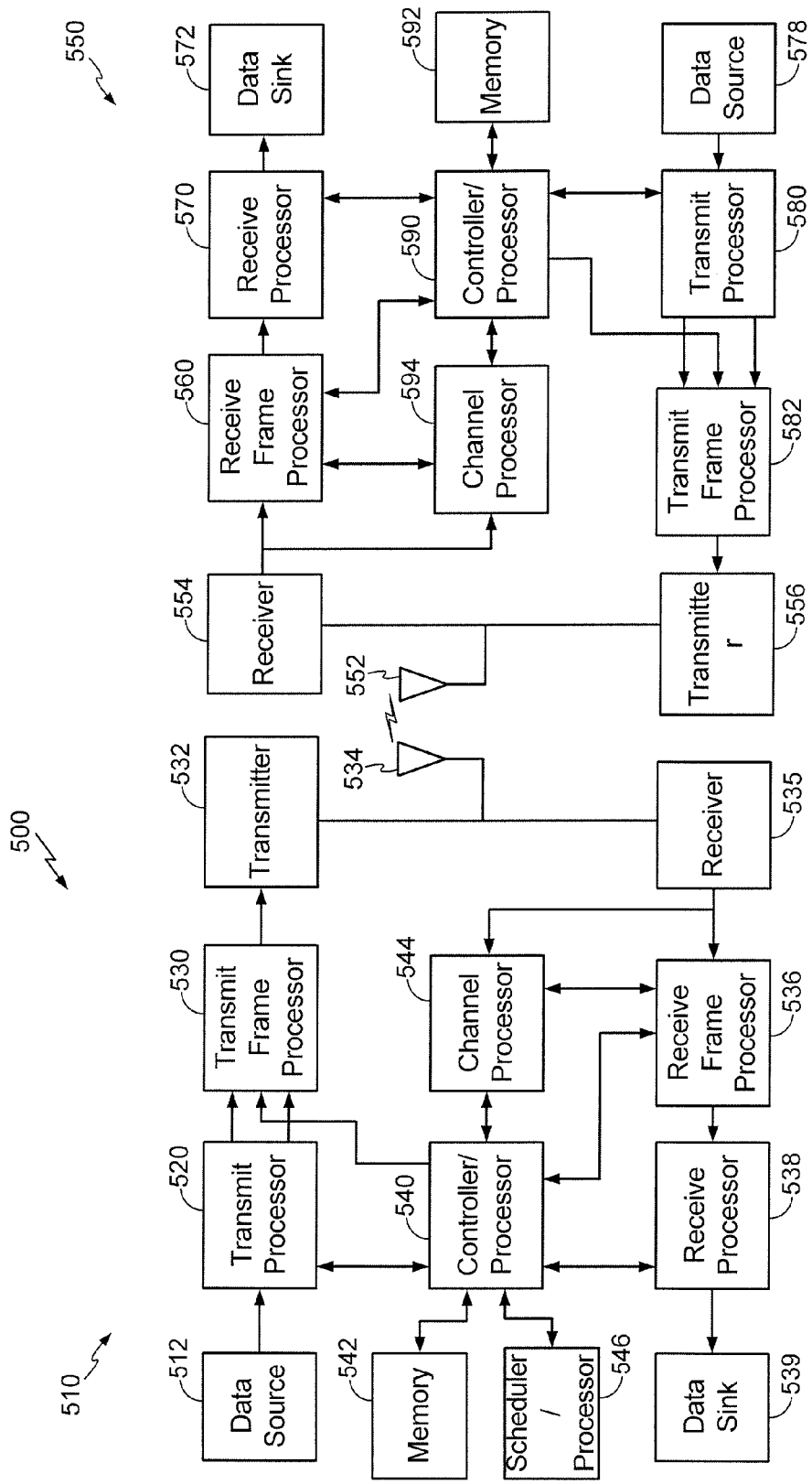
FIG. 9 is a block diagram conceptually illustrating an example of a Node B in communication with a UE in a telecommunications system, where the UE may be the same as or similar to the UE of FIG. 1.

FIG. 9 is a block diagram of a Node B 510 in communication with a UE 550, where the Node B 510 may be the Node B 208 in FIG. 6, the UE 550 may be the UE 210 in FIG. 6 or the UE 40 in FIG. 1 including terminal equipment 12 and modem component 22. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols.

Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of power management in a wireless communication device, comprising:
   detecting a change in a serving cell for a terminal equipment (TE) from a first cell to a second cell;
   generating a cell change notification at a modem component in response to detecting a change in the serving cell from the first cell to the second cell;
   determining that the TE is in a low power state;
   detecting a first radio access technology (RAT) of the first cell and a second RAT of the second cell;
   determining that the second RAT is part of a same technology mode family as the first RAT, wherein each technology mode family includes identifies a family of one or more RATs that have similar communication parameters;
   suppressing a sending of the generated cell change notification from the modem component to a data processor associated with the TE based on a determination that the second RAT is part the same technology mode family as the first RAT and a determination that the TE is in the low power state; and maintaining the TE in the low power state in response to suppressing the sending of the generated cell change notification from the modem component to the data processor.

2. The method of claim 1, wherein determining that the TE is in the low power state comprises receiving an identification of the low power state from the data processor.

3. The method of claim 2, wherein receiving the identification of the low power state from the data processor is based on one or both of a determination that a screen of the TE is off or a determination that the TE is not on an active data call.

4. The method of claim 1, wherein each technology mode family comprises a set of communication parameters each having a mode-specific range.

5. The method of claim 1, wherein detecting the first RAT of the first cell and the second RAT of the second cell further comprises detecting a respective technology mode of the first RAT and the second RAT that corresponds to a first technology mode family or a second technology mode family different from the first technology mode family, and wherein determining that the second RAT is in the same technology mode family as the first RAT further comprises determining that the respective technology mode of the first RAT and the second RAT are each in one of the first technology mode family or the second technology mode family.

6. The method of claim 1, wherein the cell change notification comprises a data system status notification.

7. A non-transitory computer-readable medium storing computer-executable code, executed by a processor, comprising:

code for detecting a change in a serving cell for a terminal equipment (TE) from a first cell to a second cell;

code for generating a cell change notification at a modem component in response to detecting a change in the serving cell from the first cell to the second cell; code for determining that the TE is in a low power state;

code for detecting a first radio access technology (RAT) of the first cell and a second RAT of the second cell;

code for determining that the second RAT is part of a same technology mode family as the first RAT, wherein each technology mode family includes identifies a family of one or more RATs that have similar communication parameters;

code for suppressing a sending of the generated cell change notification from the modem component to a data processor associated with the TE based on a determination that the second RAT is part the same technology mode family as the first RAT and a determination that the TE is in the low power state; and code for maintaining the TE in the low power state in response to suppressing the sending of the generated cell change notification from the modem component to the data processor.

8. The non-transitory computer-readable medium of claim 7, wherein code for determining that the TE is in the low power state comprises code for receiving an identification of the low power state from the data processor.

9. The non-transitory computer-readable medium of claim 8, wherein the code for receiving the identification of the low power state from the data processor comprises code for receiving the identification of the low power state based on one or both of a determination that a screen of the TE is off or a determination that the TE is not on an active data call.

10. The non-transitory computer-readable medium of claim 7, wherein each technology mode family comprises a set of communication parameters each having a mode-specific range.

11. The non-transitory computer-readable medium of claim 7, wherein the code for detecting the first RAT of the first cell and the second RAT of the second cell further comprises detecting a respective technology mode of the first RAT and the second RAT that corresponds to a first technology mode family or a second technology mode family different from the first technology mode family, and wherein the code for determining that the second RAT is in the same technology mode family as the first RAT further comprises code for determining that the respective technology mode of the first RAT and the second RAT are each in one of the first technology mode family or the second technology mode family.

12. An apparatus for power management, comprising:

means for detecting a change in a serving cell for a terminal equipment (TE) from a first cell to a second cell;

means for generating a cell change notification at a modem component in response to detecting a change in the serving cell from the first cell to the second cell; means for determining that the TE is in a low power state;

means for detecting a first radio access technology (RAT) of the first cell and a second RAT of the second cell;

means for determining that the second RAT is part of a same technology mode family as the first RAT, wherein each technology mode family includes identifies a family of one or more RATs that have similar communication parameters;

means for suppressing a sending of the generated cell change notification from the modem component to a data processor associated with the TE based on a determination that the second RAT is part the same technology mode family as the first RAT and a determination that the TE is in the low power state; and means for maintaining the TE in the low power state in response to suppressing the sending of the generated cell change notification from the modem component to the data processor.

13. The apparatus of claim 12, wherein the means for determining that the TE is in the low power state comprises means for receiving an identification of the low power state from the data processor.

14. The apparatus of claim 13, wherein the means for receiving the identification of the low power state from the data processor comprises means for receiving the identification of the low power state based on one or both of a determination that a screen of the TE is off or a determination that the TE is not on an active data call.

15. The apparatus of claim 12, wherein each technology mode family comprises a set of communication parameters each having a mode-specific range.

16. The apparatus of claim 12, wherein the means for detecting the first RAT of the first cell and the second RAT of the second cell further comprises detecting a respective technology mode of the first RAT and the second RAT that corresponds to a first technology mode family or a second technology mode family different from the first technology mode family, and wherein the means for determining that the second RAT is in the same technology mode family as the first RAT further comprises means for determining that the respective technology mode of the first RAT and the second RAT are each in one of the first technology mode family or the second technology mode family.

17. A user equipment apparatus, comprising: a memory storing executable instructions;

and a processor in communication with the memory, wherein the processor is configured to execute the instructions to:

detect a change in a serving cell for a terminal equipment (TE) from a first cell to a second cell;

generate a cell change notification at a modem component in response to detecting a change in the serving cell from the first cell to the second cell; determine that the TE is in a low power state;

detect a first radio access technology (RAT) of the first cell and a second RAT of the second cell;

determine that the second RAT is part of a same technology mode family as the first RAT, wherein each technology mode family includes identifies a family of one or more RATs that have similar communication parameters;

suppress a sending of the generated cell change notification from the modem component to a data processor associated with the TE based on a determination that the second RAT is part the same technology mode family as the first RAT and a determination that the TE is in the low power state; and maintain the TE in the low power state in response to suppressing the sending of the generated cell change notification from the modem component to the data processor.

18. The user equipment apparatus of claim 17, wherein to determine that the TE is in the low power state, the processor is further configured to execute the instructions to receive an identification of the low power state from the data processor.

19. The user equipment apparatus of claim 18, wherein to receive the identification of the low power state from the data processor, the processor is further configured to receive the identification based on one or both of a determination that a screen of the TE is off or a determination that the TE is not on an active data call.

20. The user equipment apparatus of claim 17, wherein each technology mode family comprises a set of communication parameters each having a mode-specific range.

21. The user equipment apparatus of claim 17, wherein the processor configured to detect the first RAT of the first cell and the second RAT of the second cell is further configured to detect a respective technology mode of the first RAT and the second RAT that corresponds to a first technology mode family or a second technology mode family different from the first technology mode family, and wherein to determine that the second RAT is in the same technology mode family as the first RAT, the processor is further configured to determine that the respective technology mode of the first RAT and the second RAT are each in one of the first technology mode family or the second technology mode family.

22. The user equipment apparatus of claim 17, wherein the cell change notification comprises a data system status notification.

* * * * *